Patented May 1, 1928.

1,668,482

UNITED STATES PATENT OFFICE.

HENRI LOUIS BARTHÉLEMY, OF VERCELLI, ITALY, ASSIGNOR TO RUTH ALDO COMPANY INC., OF NEW YORK, N. Y., A CORPORATION OF NEW YORK.

PROCESS FOR THE SAPONIFICATION OF PRIMARY SOLUTIONS OF ACETYL CELLULOSE.

No Drawing. Application filed January 27, 1928, Serial No. 249,985, and in France December 28, 1927.

From scientific and patent literature it is known that cellulose esters, particularly acetylcelluloses, can be obtained by the action of acid anhydrides (undiluted, or diluted with suitable solvents) on cellulose in the presence of a catalyzer. The catalyzer may consist of a strong mineral acid, acid salts (such as alkali bisulphates), neutral salts with acid reaction (such as copper sulphate or zinc chloride), or free halogens (chlorine, bromine and iodine).

It is also known (French Patent No. 432,046, of 5th July, 1911) that, contrary to preconceived ideas, sulphuric acid is capable of furnishing excellent results, in spite of its high catalytic activity.

However, it has been ascertained that, although leading to the production of products which are of technically good appearance, sulphuric acid exhibits serious drawbacks, which do not become manifest until after a considerable time. Just as the stability of gun cottons and nitrocelluloses generally depends, for the most part, on the small amount of sulphuric esters formed during the nitration (Hervé, Moniteur Quesneville, September 1918), it has been noticed that the stability of the acetyl- and nitrocelluloses prepared in the presence of sulphuric acid is mainly dependent on the same cause, and that acetates which are perfect during the first years following their preparation, become more and more acid in the course of time, owing to the presence of unstable sulphuric esters of the cellulose, until they finally become entirely useless for the customary purposes, having lost their tenacity.

It has been ascertained that this serious defect can be obviated, and that the sulphacetylcelluloses formed during the esterification can be completely eliminated, whilst at the same time the value of the final product can be improved as regards both solubility and the intrinsic physical and chemical properties of the transformation products obtainable industrially, by employing new acetates as originating material and modifying, in a very simple manner, the process of retrogression or partial saponification, effected after the acetylation treatment proper, so as to bring about the destruction of these sulphuric esters during the process of production itself.

Patent literature demonstrates that the saponification, as usually performed, consists in:—

(1) Adding a small quantity of water to the reacting mass and delaying the precipitation (French Patent 441,864, of 28th March, 1912), or:

(2) Adding a small quantity of water and then raising the temperature for the time necessary to attain the desired degree of solubility (French Patent No. 432,046, of 5th July, 1911), or:

(3) Introducing into the mass, at the same time as the said small quantity of water, a certain amount of sulphuric acid, or of a salt with an acid reaction, such as sodium bisulphate or zinc chloride (French Patents, No. 442,512 of 13th April, 1912, and No. 453,835 of 31th January, 1913), or:

(4) Adding a small quantity of water and catalyzer, such as sulphuric acid, the whole being diluted with acetic acid (French Patent No. 358,079 of 27th September, 1906), or:

(5) Treating the solid cellulose acetate in the aqueous solution of a dilute mineral acid, as described in French Patent No. 371,447 of 27th October, 1906, and British Patent No. 24,067 of 29th October, 1906, in which use is made of an aqueous solution of hydrochloric acid containing 500 parts of 25° Bé. acid and 2500 parts of water, or again, in French Patent No. 416,752 of 4th June, 1910, in which the acetylcellulose is saponified, not only in the solid state but also in the form of films and manufactured articles, with a view to obtaining special decorative effects; which is a very clear case of saponification in a heterogeneous medium.

Now, the process of the present invention takes place in two stages. In the first stage an aqueous solution of acetic, or formic, acid is intimately and progressively incorporated with the limpid and viscous mass which has been acetylated by one of the known processes (or, better still, by one of the processes described in the United States patent application No. 209,161 filed 28th July, 1927 for a "process for the homogeneous esterification of cellulose," or in the United States patent application, filed on the same day by the same inventor, for an "improvement in the esterification of cellulose," or in the United States patent application No. 209,166 filed 28th July, 1927 for a "process for manufacturing cellulose esters"), said acid solution being so calculated that the amount of water thereby introduced shall be just sufficient to completely decompose the excess of acetic anhydride, whilst, on the other hand, the amount of acid will suffice to prevent incipient flocculation. The mass is cooled down to the initial temperature, or sufficiently near thereto as to prevent alteration of the acetylcellulose during the second stage.

Said second stage consists in incorporating with the mass a fresh quantity of an aqueous solution of acetic, or formic, acid, but containing, this time, a quantity of hydrochloric acid, accompanied by hydrofluoric acid, the whole being calculated so that the number of hydrogen ions introduced by these acids is at least equal or superior to the hydrogen ions introduced by the sulphuric acid primarily employed as the esterfying catalyzer. Moreover, the relative proportions of the whole are so calculated that the amount of water present in the entire mass will be between 5 and 15% of the total amount of the organic acids present after the last drop of the second bath has been introduced.

Under these conditions, and in time, the partial saponification of the acetylcellulose proceeds in a homogeneous manner and is accompanied by the destruction of the acetosulphuric esters of the cellulose.

If desired, the operation may be accelerated by slightly raising the temperature.

The operation is completed in the usual manner, by precipitating the acetic sol in water or any other flocculating agent, followed by a sufficient number of washings with hot water before transferring the acetate to the dryer.

Adding water after completed acetylation is not a new feature, but one that is specific for any reversible esterfication. This addition is necessary in order to destroy the excess of acetic anhydride and set up the inverse reaction of the phenomenon of esterfication. On the other hand, the employment of hydrochloric acid, by itself or mixed with hydrofluoric acid, in a slightly diluted acetic medium, is entirely new and cannot be likened, for example to the process described in the United States Patent No. 838,850 of 23rd November, 1904, in which use is made of an addition of 100 parts of glacial acetic acid, 90 parts of water and 10 parts of 95% sulphuric acid; nor can it be likened to the other patents already mentioned above.

In addition to the advantage of causing the destruction of the cellulose sulphates, the employment of these hydro-acids, hydrochloric and hydrofluoric, affords the enormous advantage of effecting the solution of the lime salts and silica forming part of the mineral substances introduced by the fibre, these passing away, in a state of colloidal solution, in the washings. Consequently, from the optical point of view, acetates of remarkable limpidity are obtained.

The process may be carried into practice in the following typical manner:—

A primary solution of cellulose acetate is prepared by means of 18 kg. of bleached cotton, 90 kg. of 95% glacial acetic acid, 45 kg. of 93% acetic anhydride and 0.813 kg. of 95% sulphuric acid.

The temperature of this solution is raised to 42°, and 25 kg. of 60% acetic acid are added by degrees, the temperature then rising by approximately another 12°. It is reduced, by cooling, to 41° C., and, at the end of about 45 minutes, there is added a bath consisting of 30 kg. of 60% acetic acid containing in solution 0.730 kg. of dry hydrochloric acid gas and 0.730 kg. of dry gaseous hydrofluoric acid. The temperature of 41° is maintained for the period necessary to furnish a cellulose acetate with the acetyl value 38–43%, comprised between 38 and 40.5% (see Moniteur Quesneville September 1913). Flocculation is then effected at once by 45 kg. of water containing 450 grms. of sodium carbonate, and the operation is completed by the usual cold and hot washings.

I claim:—

1. In the manufacture of acetyl celluloses or other mixed acetic esters of cellulose intended for subsequent industrial utilization and wherein acetylation is performed in the presence of a catalyzer, effecting saponification in the primitive acetic sol by the addition of a dilute acetic medium containing hydrochloric and hydrofluoric acids.

2. In the manufacture of acetyl celluloses or other mixed acetic esters of cellulose intended for subsequent industrial utilization and wherein acetylation is performed in the presence of a catalyzer, effecting saponification in the primitive acetic sol by the addition of a dilute acetic medium containing hydrochloric and hydrofluoric acids, in a proportion strictly complying with the condition that the number of hydrogen ions introduced by said hydro-acids is not less than the number of hydrogen ions introduced by the acetylating catalyzer.

3. In the manufacture of acetyl celluloses or other mixed acetic esters of cellulose intended for subsequent industrial utilization and wherein acetylation is performed in the presence of a catalyzer, a process of saponifying the primitive acetic sol in two stages, the first stage consisting in gradually mixing with the mass an aqueous solution of a weak organic acid, and the second stage consisting in incorporating an aqueous solution of a weak organic acid containing hydrochloric and hydrofluoric acids.

4. In the manufacture of acetyl celluloses or other mixed acetic esters of cellulose intended for subsequent industrial utilization and wherein acetylation is performed in the presence of a catalyzer, a process of saponifying the primitive acetic sol in two stages, the first stage consisting in gradually mixing with the mass an aqueous solution of a weak organic acid such that the amounts of water and acid thereby introduced are respectively sufficient to decompose the excess of acetic anhydride and to prevent incipient flocculation, and the second stage consisting in incorporating an aqueous solution of a weak organic acid containing sufficient hydrochloric and hydrofluoric acids to ensure that the number of hydrogen ions introduced thereby is not less than the number of hydrogen ions introduced by the acetylating catalyzer.

5. In the manufacture of acetyl celluloses or other mixed acetic esters of cellulose intended for subsequent industrial utilization and wherein acetylation is performed in the presence of a catalyzer, a process of saponifying the primitive acetic sol in two stages, the first stage consisting in gradually mixing with the mass an aqueous solution of a weak organic acid such that the amounts of water and acid thereby introduced are respectively sufficient to decompose the excess of acetic anhydride and to prevent incipient flocculation, and the second stage consisting in incorporating an aqueous solution of a weak organic acid containing hydrochloric and hydrofluoric acids such that the number of hydrogen ions introduced thereby is not less than the number of hydrogen ions introduced by the acetylating catalyzer while the amount of water in the entire mass will be between 5 and 15% of the total amount of organic acids present.

6. A process of manufacturing actyl celluloses or other mixed acetic esters of cellulose intended for subsequent industrial utilization, consisting in performing acetylation in the presence of a catalyzer, then effecting saponification in the primitive acetic sol by the addition of a dilute acetic medium containing hydrochloric and hydrofluoric acids, and thereafter completing the operation by precipitating the acetic sol in a flocculating agent and washing and drying the same.

7. A process of manufacturing acetyl celluloses or other mixed acetic esters of cellulose intended for subsequent industrial utilization, consisting in performing acetylation in the presence of a catalyzer, then effecting saponification in the primitive acetic sol by the addition of a dilute acetic medium containing sufficient hydrochloric and hydrofluoric acids to ensure that the number of hydrogen ions so introduced is not less than the number of hydrogen ions introduced by the acetylating catalyzer, and therafter precipitating the acetic sol in a flocculating agent and washing and drying the same.

8. A process of manufacturing acetyl celluloses or other mixed acetic esters of cellulose intended for subsequent industrial utilization, consisting in performing acetylation in the presence of a catalyzer, then gradually mixing with the mass an aqueous solution of a weak organic acid such that the amounts of water and acid thereby introduced are respectively sufficient to decompose the excess of acetic anhydride and to prevent incipient flocculation, then incorporating (after restoration of substantially the initial temperature) a quantity of an aqueous solution of a weak organic acid containing hydrochloric and hydrofluoric acids to ensure that the number of hydrogen ions so introduced is not less than the number of hydrogen ions introduced by the acetylating catalyzer while the amount of water in the entire mass is between 5 and 15% of the total amount of organic acids, and thereafter completing the operation by precipitating the acetate sol in a flocculating agent and washing and drying the same.

9. A process of manufacturing acetyl celluloses for subsequent industrial utilization, consisting in first obtaining a primary solution of cellulose acetate from approximately 18 kg. of bleached cotton, 90 kg. of 95% glacial acetic acid, 45 kg. of 93% acetic anhydride and 0.813 kg. of 95% sulphuric acid; then heating this solution to about 42° C.; then introducing about 25 kg. of 60% acetic acid gradually into the solution; then reducing the temperature to about 41° C.; then adding about 30 kg. of 60% acetic acid containing in solution hydrochloric acid in quantity corresponding to 0.730 kg. of dry hydrochloric acid gas, and hydrofluoric acid corresponding in quantity to 0.730 kg. of dry hydrofluoric acid gas, the temperature being maintained at about 41° C. long enough to furnish at the end of the operation a cellulose acetate with the acetyl value 38–43%; then flocculating the product; and thereafter completing the operation by washing and drying.

10. In the process of manufacturing acetyl celluloses, the characteristic step that, following acetylation in the presence of a catalyzer, saponification is effected in the primitive acetic sol by adding as the saponifying catalyzer dilute acetic acid containing hydrochloric and hydrofluoric acids, whereby there is obtained stable cellulose acetate demineralized to the utmost possible extent.

11. In the process of manufacturing acetyl celluloses, the characteristic step that, following acetylation in the presence of sulphuric acid as catalyzer, saponification is effected in the primitive acetic sol by adding as the saponifying catalyzer dilute acetic acid containing hydrochloric and hydrofluoric acids, whereby there is obtained stable cellulose acetate free from cellulose sulphates and demineralized to the utmost possible extent.

12. A process for the saponification of acetic solutions of primary cellulose acetates, consisting in that, following acetylation, the saponification is effected by the addition of dilute acetic acid in presence of a catalyzer composed of hydrochloric acid with an addition of hydrofluoric acid.

13. A process for the saponification of acetic solutions of primary cellulose acetates, consisting in that, following acetylation in presence of sulphuric acid as catalyzer; the saponification is effected by the addition of dilute acetic acid in presence of a catalyzer composed of hydrochloric acid with an addition of hydrofluoric acid.

14. A process for the saponification of acetic solutions of primary cellulose acetates, consisting in that, after acetylation in presence of sulphuric acid as catalyzer; the saponification is effected by the addition of dilute acetic acid in presence of a catalyzer composed of hydrochloric acid with an addition of hydrofluoric acid, the proportions of these two hydro-acids being such that the number of hydrogen ions thereby introduced shall at least equal the number of hydrogen ions introduced by the acetylation catalyzer.

15. A process for the saponification of acetic solutions of primary cellulose acetates, consisting, in a preliminary state, in intimately incorporating with the mass, at the end of the acetylation treatment, a calculated aqueous solution of acetic acid, then restoring the mass to approximately the initial temperature and then, in a second state, incorporating with the mass an aqueous solution of acetic acid containing hydrochloric acid and hydrofluoric acid.

16. A process of manufacturing acetyl celluloses for subsequent industrial utilization, consisting in first obtaining a primary solution of cellulose acetate from bleached cotton, glacial acetic acid, acetic anhydride and sulphuric acid; then heating this solution, then introducing acetic acid gradually into the solution; then reducing the temperature; then adding acetic acid containing in solution hydrochloric acid and hydrofluoric acid, the temperature being maintained long enough to furnish at the end of the operation a cellulose acetate soluble in acetone; then flocculating the product, and thereafter by washing and drying the product.

In testimony whereof I affix my signature.

HENRI LOUIS BARTHÉLEMY.